(12) United States Patent
Perrin et al.

(10) Patent No.: US 7,490,096 B2
(45) Date of Patent: Feb. 10, 2009

(54) AUTOMATIC INTENT LOG TESTING

(75) Inventors: Neil V. Perrin, Westminster, CO (US); Jeffrey S. Bonwick, Los Altos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 286 days.

(21) Appl. No.: 11/431,379

(22) Filed: May 10, 2006

(65) Prior Publication Data
US 2007/0112884 A1 May 17, 2007

Related U.S. Application Data

(60) Provisional application No. 60/733,454, filed on Nov. 4, 2005.

(51) Int. Cl.
*G06F 7/00* (2006.01)
*G06F 17/30* (2006.01)

(52) U.S. Cl. .................. 707/100; 707/1; 707/6; 707/10; 707/101; 707/102

(58) Field of Classification Search .......... 707/1, 707/10, 100
See application file for complete search history.

(56) References Cited

U.S. PATENT DOCUMENTS

| | | | | |
|---|---|---|---|---|
| 5,774,717 A | * | 6/1998 | Porcaro | 707/202 |
| 5,819,292 A | * | 10/1998 | Hitz et al. | 707/203 |
| 5,870,757 A | * | 2/1999 | Fuller | 707/201 |
| 5,913,208 A | * | 6/1999 | Brown et al. | 707/3 |
| 6,732,124 B1 | * | 5/2004 | Koseki et al. | 707/202 |
| 2002/0138502 A1 | * | 9/2002 | Gupta | 707/200 |
| 2003/0204530 A1 | * | 10/2003 | Anderson et al. | 707/200 |
| 2003/0225795 A1 | * | 12/2003 | Abdallah et al. | 707/200 |
| 2003/0229656 A1 | * | 12/2003 | Hitz et al. | 707/205 |
| 2004/0088316 A1 | * | 5/2004 | Cleraux et al. | 707/102 |
| 2004/0210608 A1 | * | 10/2004 | Lee et al. | 707/204 |
| 2004/0267836 A1 | * | 12/2004 | Armangau et al. | 707/203 |
| 2005/0086294 A1 | * | 4/2005 | Kodama | 709/203 |
| 2005/0120036 A1 | * | 6/2005 | Verma et al. | 707/100 |
| 2005/0209991 A1 | * | 9/2005 | Rogers et al. | 707/1 |
| 2005/0251500 A1 | * | 11/2005 | Vahalia et al. | 707/1 |
| 2006/0253502 A1 | * | 11/2006 | Raman et al. | 707/202 |

OTHER PUBLICATIONS

"A fast start-up technique for flash memeory based computing systems"—Keun Soo Yim, Jihong Kim, and kern Koh—Symposium on Applied Computing—2005 ACM, sante Fe, New Mexico, (pp. 843-849).*
"Recovery in the Calypso file system"—Murthy Devararakonda, Bill Kish and Ajay Mohindra—ACM Transactions on Computing System (TOCS) vol. 14, issue 3 Aug. 1996 (pp. 287-310).*
"Real-time disk scheduling in a mixed-media file system"—Bosch, P. and Mullender, S.J. May-2 Jun. 2000 IEEE pp. 23-32.*

* cited by examiner

*Primary Examiner*—Jean B. Fleurantin
*Assistant Examiner*—Anh Ly
(74) *Attorney, Agent, or Firm*—Osha • Liang LLP

(57) ABSTRACT

A method for testing an intent log for a file system that includes creating a first file system, issuing a command to freeze the first file system, performing a plurality of commands on the first file system to obtain a plurality of deltas, wherein each of the plurality of deltas is stored in the intent log and is not committed to the first file system, copying the first file system to obtain a second file system, committing each of the plurality of deltas in the intent log to the second file system, unfreezing the first file system and committing each of the deltas in the intent log to the first file system, and comparing the first file system, after committing each of the deltas in the intent log, to the second file system to determine whether the intent log is valid.

12 Claims, 3 Drawing Sheets

AUTOMATIC INTENT LOG TESTING

CROSS REFERENCE TO RELATED APPLICATIONS

This application claims benefit of U.S. Provisional Application Ser. No. 60/733,454 filed on Nov. 4, 2005, entitled "Dynamic Intent Log and Intent Log Testing" in the names of Neil V. Perrin, Jeffrey S. Bonwick, and Stuart J. Maybee.

BACKGROUND

Most modern file systems include a logging feature to ensure faster write times and crash recovery times. Intent logging is a type of file system journaling that enables faster file system operation and system boot. It is relatively simple to implement and inexpensive to the operation of the file system. Empirical tests have shown that logging file systems perform equal to or better than non-logging file systems.

The logging feature is a common option to a conventional file system. For example, Unix File System (UFS) includes a logging feature. More specifically, UFS supports intent logging. To implement intent logging, UFS initially allocates a certain amount of disk space within the persistent storage (e.g., hard disks, etc.). Within that space, an intent log (i.e., a data structure) is used to store all changes (i.e., "deltas") made to the metadata associated with the file system. The metadata associated with the file system typically corresponds to information related to the data in the file system, for example, the file name.

Once the metadata changes, the corresponding deltas are stored in the intent log. At a later time, the deltas in the intent log are committed to the file system. To commit the deltas in the intent log to the file system, the intent log is traversed and each delta that is encountered is committed to the file system. Once the file system (or a portion thereof) has been updated with the delta, then the delta is removed from the intent log.

During the typical operation of the logging feature, once a delta is generated (i.e., some file system metadata changes), a certain amount of disk space, in the disk space pre-allocated for the intent log, is requested. The amount of disk space requested corresponds to the size of the delta. If there is no unallocated space in the pre-allocated disk space (i.e., because the pre-allocated disk space is full), then deltas already stored in the intent log must be committed to the file system and removed from the intent log in order to make space for the new delta. While the currently stored deltas are being committed to the file system, applications using the file system are typically blocked until there is sufficient space to insert additional deltas.

The benefits of an intent log for a file system are realized only if deltas in the intent log are current and accurate. Conventional methods for testing the intent log for accuracy of the deltas involve manually crashing the file system and checking to confirm that the deltas in the intent log are correctly replayed.

SUMMARY

In general, in one aspect, the invention relates to a method for testing an intent log for a file system, comprising creating a first file system, issuing a command to freeze the first file system, performing a plurality of commands on the first file system to obtain a plurality of deltas, wherein each of the plurality of deltas is stored in the intent log and is not committed to the first file system, copying the first file system to obtain a second file system, committing each of the plurality of deltas in the intent log to the second file system, unfreezing the first file system and committing each of the deltas in the intent log to the first file system, and comparing the first file system, after committing each of the deltas in the intent log, to the second file system to determine whether the intent log is valid.

In general, in one aspect, the invention relates to a method for testing an intent log for a file system implemented on a computer, comprising creating a first file system and a second file system, performing a plurality of commands on the first file system, wherein each of the plurality of deltas is stored in the intent log and is not committed to the first file system, performing the plurality of commands on the second file system, and committing each of the plurality of deltas in the intent log to the first file system, comparing the first file system, after committing each of the plurality of deltas in the intent log, to the second file system to determine whether intent log is valid.

In general, in one aspect, the invention relates to a computer readable medium comprising computer executable instructions to test an intent log for a file system by creating a first file system, issuing a command to freeze the first file system, performing a plurality of commands on the first file system to obtain a plurality of deltas, wherein each of the plurality of deltas is stored in the intent log and is not committed to the first file system, copying the first file system to obtain a second file system, committing each of the plurality of deltas in the intent log to the second file system, unfreezing the first file system and committing each of the deltas in the intent log to the first file system, and comparing the first file system, after committing each of the deltas in the intent log, to the second file system to determine whether the intent log is valid.

Other aspects of the invention will be apparent from the following description and the appended claims.

DETAILED DESCRIPTION

Figure 1:
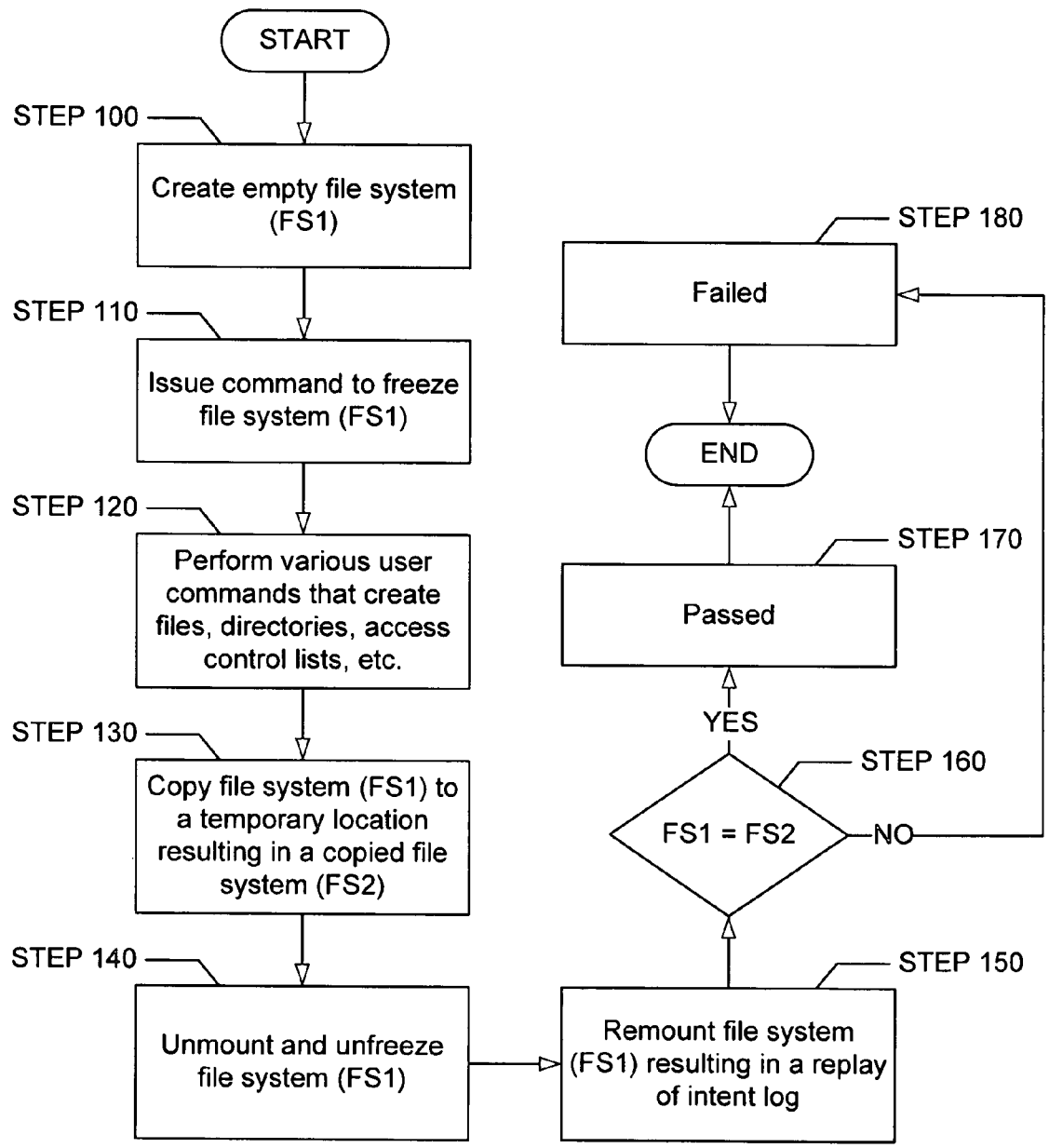
FIG. 1 shows a flowchart for testing integrity of an intent log automatically in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention relate to a mechanism for automatic testing of the intent log integrity. More specifically, the invention relates to a method and system for creating an intent log, committing the intent log to a file system and then verifying that resulting file system (i.e., the file system resulting from committing the deltas in the intent log) is in the proper state (i.e., the contents of the file system with the committed deltas accurately reflect the intended contents of the file system).

FIG. 1 shows a flowchart of an automatic intent log testing mechanism in accordance with one or more embodiments of the invention. Initially, an empty file system, FS1, is created (STEP 100). In one embodiment of the invention, a file system is empty if it does not contain any data aside from the data necessary for a system to use the file system. Said another way, an empty file system corresponds to a file system once it has been created but prior to adding any data to the file system. Continuing with the discussion of FIG. 1, next, a freeze command is issued to freeze FS1 (STEP 110). In one embodiment of the invention, the freeze command stops commitment of deltas (and other transactions to the file system) to the file system and prevent deltas from being discarded. Said another way, the freeze command stops the content of the file system from changing. In the next step, various user commands for file creation, directory creation, and accessing control lists are performed, resulting in a buildup of deltas in an intent log of FS1 (STEP 120). Since FS1 remains frozen, the list of deltas in FS1 is prevented from being committed to the file system (FS1).

Continuing with the discussion of FIG. 1, FS1 is then copied to a temporary location to create a second file system, FS2 (STEP 130). The result of STEP 130 is two file systems FS1 and FS2. As FS2 is a copy of FS1, FS2 is associated with an intent log, where the contents of its intent log correspond to the contents of the intent log for FS1 In particular, the contents of the intent log associated with FS2 corresponds to all deltas generated in STEP 120.

Unlike FS1, FS2 is not "frozen" (as discussed above in STEP 110), thus, once FS2 has been created, the deltas in the intent log associated with FS2 are committed to FS2. In one embodiment of the invention, no additional changes are made to the FS2 other than committing the deltas in its intent log.

In a subsequent step, FS1 is unmounted (i.e., is no longer accessible by the computer system with which it is associated) (STEP 140). At this stage, the intent log of FS1 has a complete set of deltas to replay, but FS1 remains empty. FS1 is subsequently remounted and each delta in its intent log is replayed (i.e., committed to FS1 (STEP 150). Once all the deltas are committed to FS1, FS1 and FS2 are compared to determine if their contents is the same (STEP 160). A successful comparison confirms the validity of the intent log of FS1 (STEP 170). A failed comparison suggests that there are problems with the intent log of FS1 (STEP 180).

Those skilled in the art will appreciate that any file system with a known state (i.e., the contents of the file system is known) as opposed to an empty file system, may be used.

Figure 2:
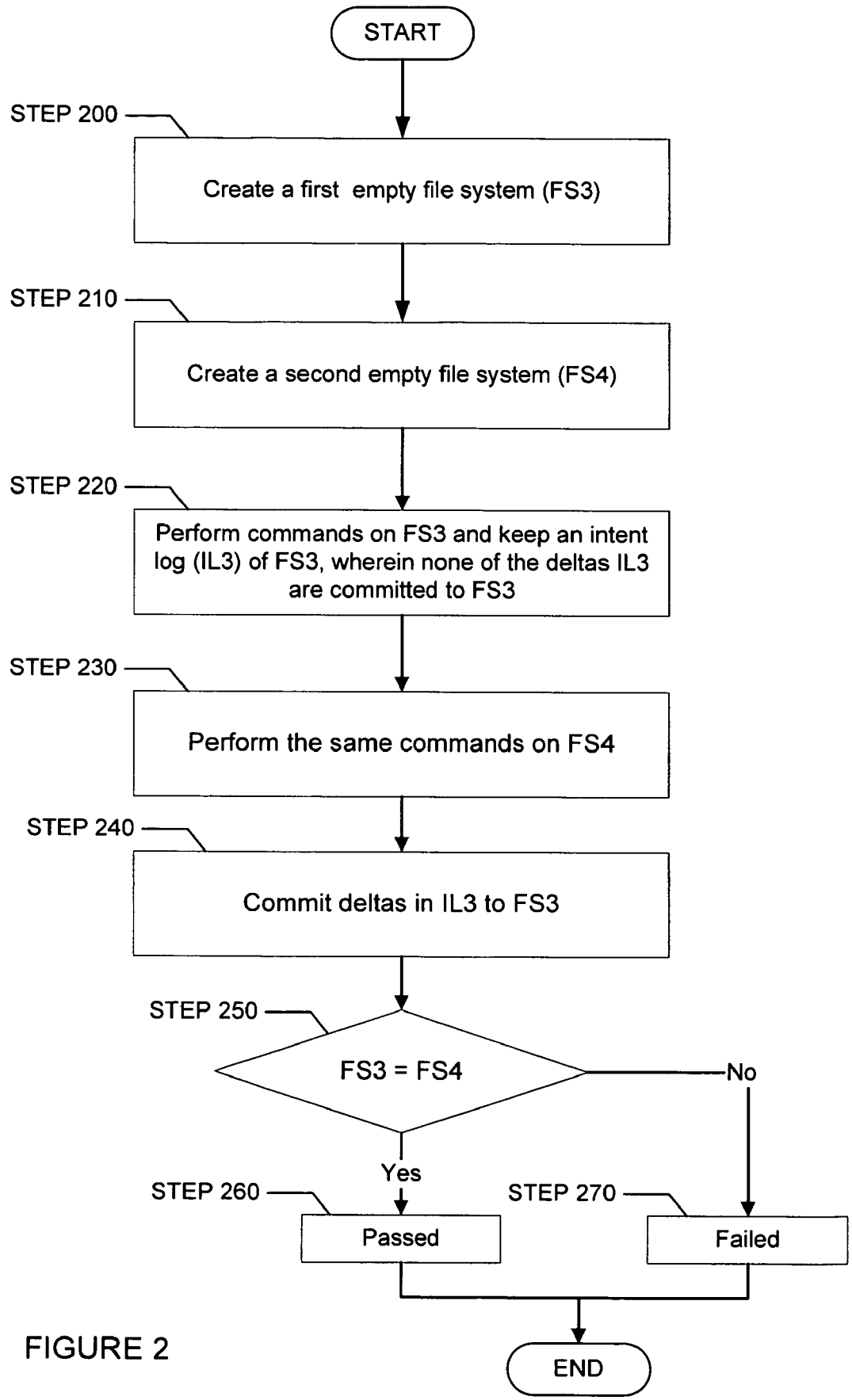
FIG. 2 shows a flowchart for testing integrity of an intent log automatically in accordance with one or more embodiments of the invention.

FIG. 2 shows an alternate embodiment for verifying the integrity of the intent log in accordance with one embodiment of the invention. . Initially, a first empty file system, FS3, is created (STEP 200). In the next step, a second empty file system, FS4, is created (STEP 210). Then, a series of commands (i.e., commands that generate deltas) are performed on FS3 (ST220). A delta corresponding to each of the commands is then recorded in an intent log (IL3) associated with FS3. None of the deltas recorded in FS3 are committed to the file system while the commands are being performed on FS3. In a subsequent step, the same commands (i.e., the commands previously performed on FS3) are performed on FS4 (STEP 230). However, unlike in STEP 220, the deltas generated in STEP 230 are committed to the FS4.

At STEP 240, the deltas in IL3 are committed to FS3. Once all the deltas in IL3 have been committed to FS3, the two file systems, FS3 and FS4, are compared to determine whether the contents of each of the file systems is the same (STEP 250). If the content of the two file systems is the same, the integrity of IL3 is successfully validated (STEP 260). If the content of FS3 and FS4 does not match, then IL3 fails the integrity test. (STEP 270).

Figure 3:
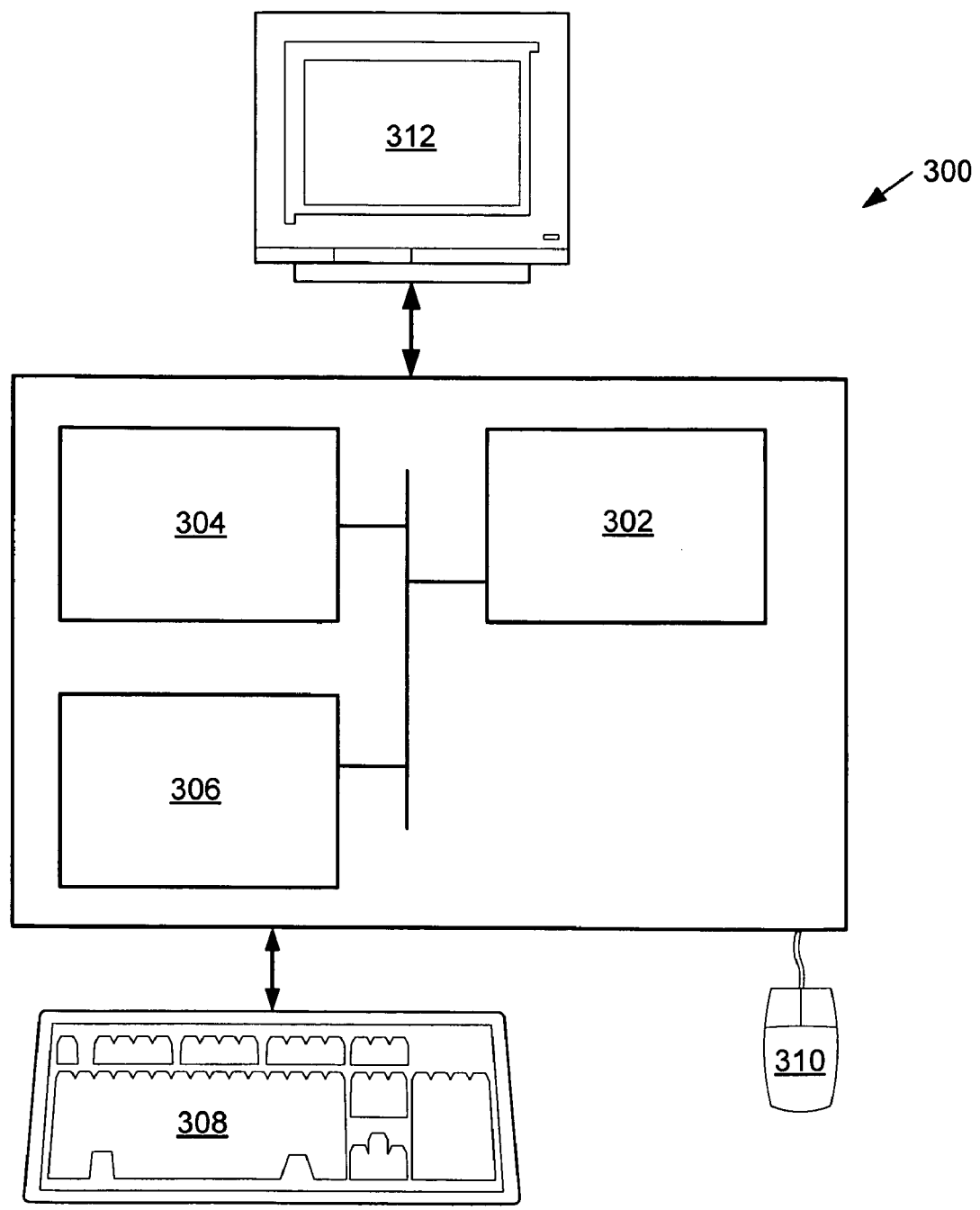
FIG. 3 shows a computer system in accordance with one or more embodiments of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer system (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Furthermore, those skilled in the art will appreciate that one or more elements of the aforementioned computer system (300) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Moreover, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for testing an intent log for a file system, comprising:
    creating a first file system;
    issuing a command to freeze the first file system, wherein freezing the first file system stops commitment of deltas to the first file system, wherein deltas correspond to changes made to the metadata associated with the first file system;
    performing a plurality of commands on the first file system to obtain a plurality of deltas, wherein each of the plurality of deltas is stored in the intent log and is not committed to the first file system;
    copying the first file system to obtain a second file system;
    committing each of the plurality of deltas in the intent log to the second file system;
    unfreezing the first file system and subsequently committing each of the deltas in the intent log to the first file system, wherein unfreezing the first file system comprises unmounting the first file system and wherein the first file system is remounted prior to committing each of the deltas in the intent log to the first system; and
    comparing the first file system, after committing each of the deltas in the intent log, to the second file system to determine whether the intent log is valid.

2. The method of claim 1, wherein the plurality of commands comprises at least one selected from the group consisting of creating files, creating directories, and accessing control lists.

3. The method of claim 1, wherein the second file system is created at a temporary location.

4. The method of claim 1, wherein the method for testing the intent log for the file system is automated.

5. A method for testing an intent log for a file system implemented on a computer, comprising:
- creating a first file system and a second file system;
- issuing a command to freeze the first file system;
- performing, after issuing the freeze command, a plurality of commands on the first file system to obtain a plurality of deltas, wherein each of the plurality of deltas corresponds a change made to the metadata associated with the first file system, wherein each of the plurality of deltas is stored in the intent log and is not committed to the first file system;
- performing the plurality of commands on the second file system;
- unfreezing the first file system, wherein unfreezing the first file system comprises unmounting the first file system and wherein the first file system is remounted prior to committing each of the deltas in the intent log to the first file system;
- committing each of the plurality of deltas in the intent log to the first file system; and
- comparing the first file system, after committing each of the plurality of deltas in the intent log, to the second file system to determine whether intent log is valid.

6. The method of claim 5, wherein the plurality of commands comprises at least one selected from the group consisting of creating files, creating directories, and accessing control lists.

7. The method of claim 5, wherein the method for testing the intent log for the file system is automated.

8. The method of claim 5, wherein the first file system and the second file system are empty prior to performing the plurality of commands.

9. A computer readable storage medium comprising computer executable instructions to test an intent log for a file system by:
- creating a first file system;
- issuing a command to freeze the first file system, wherein freezing the first file system stops commitment of deltas to the file system, wherein deltas correspond to changes made to the metadata associated with the first file system;
- performing a plurality of commands on the first file system to obtain a plurality of deltas, wherein each of the plurality of deltas is stored in the intent log and is not committed to the first file system;
- copying the first file system to obtain a second file system;
- committing each of the plurality of deltas in the intent log to the second file system;
- unfreezing the first file system and subsequently committing each of the deltas in the intent log to the first file system, wherein unfreezing the first file system comprises unmounting the first file system and wherein the first file system is remounted prior to committing each of the deltas in the intent log to the first file system; and
- comparing the first file system, after committing each of the deltas in the intent log, to the second file system to determine whether the intent log is valid.

10. The computer readable medium of claim 9, wherein the plurality of commands comprises at least one selected from the group consisting of creating files, creating directories, and accessing control lists.

11. The computer readable medium of claim 9, wherein the second file system is created at a temporary location.

12. The computer readable medium of claim 9, wherein the method for testing the intent log for the file system is automated.

* * * * *